United States Patent [19]
Losada

[11] Patent Number: 5,897,082
[45] Date of Patent: Apr. 27, 1999

[54] POWER ACTUATED FASTENER FOR PIPE

[76] Inventor: Al Losada, 204 Folino Dr., Bridgeport, Conn. 06606

[21] Appl. No.: 08/889,373

[22] Filed: Jul. 8, 1997

[51] Int. Cl.[6] .................................................... F16L 3/08
[52] U.S. Cl. .......................... 248/65; 248/74.1; 248/71; 411/441; 411/480
[58] Field of Search .............................. 248/65, 71, 74.1, 248/74.2, 300, 316; 411/441, 480

[56] References Cited

U.S. PATENT DOCUMENTS

| | | | |
|---|---|---|---|
| 1,476,836 | 12/1923 | Pleister | 248/74 |
| 2,298,560 | 10/1942 | Harrison | 248/71 |
| 2,417,245 | 3/1947 | Eggert et al. | 248/74 |
| 2,961,210 | 11/1960 | Plaff et al. | 248/74 |
| 2,984,442 | 5/1961 | Lawson | 248/62 |
| 3,232,569 | 2/1966 | Deardorf | 248/74 |
| 3,491,972 | 1/1970 | Townshend | 248/71 |
| 4,370,082 | 1/1983 | Sundberg | 411/61 |
| 4,736,923 | 4/1988 | Losada | 248/547 |
| 5,178,503 | 1/1993 | Losada | 411/441 |
| 5,417,534 | 5/1995 | Losada | 411/441 |
| 5,554,131 | 9/1996 | Lacivita | 604/198 |
| 5,624,200 | 4/1997 | Janssen et al. | 411/441 |
| 5,634,756 | 6/1997 | Losada | 411/441 |
| 5,669,589 | 9/1997 | Janssen et al. | 248/65 |
| 5,697,431 | 12/1997 | Nagasaka | 165/149 |

FOREIGN PATENT DOCUMENTS 25 04 816 A1  8/1975  Germany.

Primary Examiner—Leslie A. Braun
Assistant Examiner—Kimberly T. Wood
Attorney, Agent, or Firm—Fattibene and Fattibene; Paul A. Fattibene; Arthur T. Fattibene

[57] ABSTRACT

A fastener assembly with a raised portion holding a nail at an oblique angle for attaching a pipe to a substrate. A curved portion is attached to a substantially planar portion having a raised portion with a hole therein. The hole is eccentrically formed within the raised portion such that when a nail is held perpendicular to a substrate, the substantially planar portion is raised off of the substantially planar substrate. The curved portion is formed to compliment the outer circumference of a pipe. When driven by a power actuated gun, the substantially planar portion is driven downward in contact with the substrate, forcing the curved portion to snugly retain the pipe. The fastener assembly securely holds a pipe and is used in many different construction applications where pipes, conduits, wires or other like devices must be securely held.

6 Claims, 1 Drawing Sheet

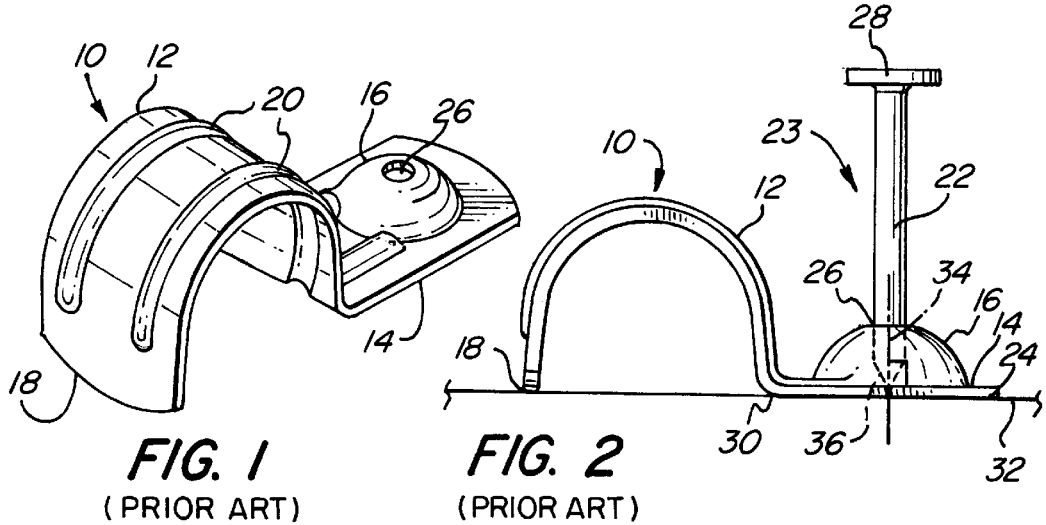
FIG. 1 (PRIOR ART)
FIG. 2 (PRIOR ART)
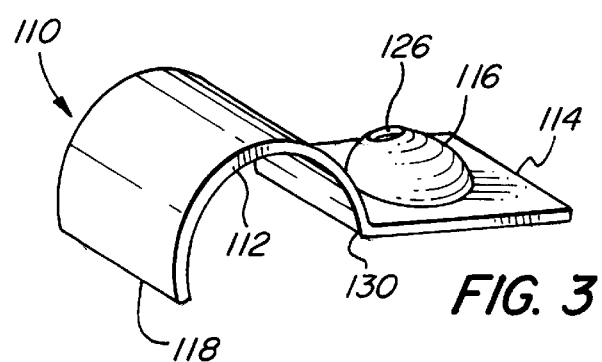
FIG. 3
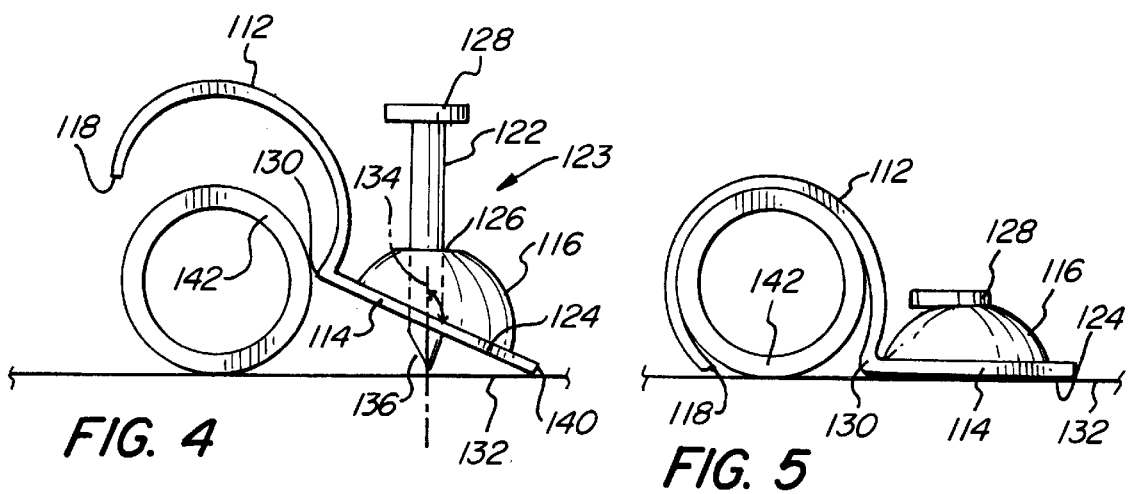
FIG. 4
FIG. 5

POWER ACTUATED FASTENER FOR PIPE

FIELD OF THE INVENTION

The present invention relates in general to a fastener used with a power actuated gun, and in particular to a fastener for securely holding a pipe.

BACKGROUND OF THE INVENTION

There are many different types of fastener assemblies for use with a power actuated gun that contain a bracket or plate in combination with a nail or stud. These fastener assemblies are used for a variety of purposes, such as attaching various substrates or for making different connections to other various construction materials including cabling, support structures, and pipes, among others. One such fastener assembly is disclosed in U.S. Pat. No. 4,736,923 entitled "Fastener Assembly" and issuing to Losada on Apr. 12, 1988, which is herein incorporated by reference. Therein disclosed is a fastener assembly having a leg portion that is angularly offset and a nail for driving into a support structure with a power actuated gun. Another fastener assembly is disclosed in U.S. Pat. No. 5,634,756 entitled "Fastener Assembly For Use With Power Actuated Gun" issuing to Losada on Jun. 3, 1997, which is herein incorporated by reference. Therein disclosed is a fastener assembly for use with a power actuated gun that has a relatively broad bearing surface and raised portions of different configurations for holding a stud or nail. This fastener assembly is used to drive a fastener for holding a structure being fastened into a hard substrate, such as masonry. There are other types of fasteners for use with a power actuated gun used in different applications. One common application is to fasten a cylindrical pipe to a hard substrate. This type of fastener typically has a curved portion and a planar portion with a nail extending from the planar portion perpendicular thereto. While these fasteners, which are used to attach pipe, are relatively simple and have performed fairly well, they are not without problems. Often, these fasteners do not hold round pipe as securely as desired. In many applications, the pipe tends to fit rather loosely in the curved bracket of the fastener assembly after the nail is driven. Due to the different types of substrate and the high force in which the nail of a power actuated fastener is driven, the nail of the fastener is often driven into a substrate with such force that the distal end of the curved portion is caused to raise above the substrate surface. This results in the pipe not being securely held or fastened. This is undesirable in that the pipe fits loosely within the fastener assembly. This has the undesirable effect of creating noise due to vibration or rattling. Also, the fastener may eventually fail, causing the pipe to break free. Accordingly, there is a need for an improved fastener assembly for use in attaching pipe securely to a substrate.

SUMMARY OF THE INVENTION

The present invention comprises a fastener assembly for use with a power actuated gun in securely attaching pipe or other cylindrical or rounded material to a substrate. The fastener comprises a curved portion having a shape that matches the round circumference of the pipe or other rounded material and an attached substantially flat bearing surface portion having a raised portion thereon. The raised portion has an offset or eccentrically positioned hole therein. The raised portion and the hole within the raised portion are formed such that a nail having a longitudinal axis extends through the hole in the raised portion forming an obtuse angle with the planar surface of the substantially flat bearing surface portion. Accordingly, prior to being driven, the planar surface of the substantially flat bearing surface portion is held at an angle to the plane of the substrate. Upon being driven by a power actuated gun, the nail or stud causes the raised end of the substantially flat bearing surface portion downward, bringing the curved surface therewith to securely hold a pipe or other rounded material.

Accordingly, it is an object of the present invention to securely hold a pipe with a fastener assembly driven by a power actuated gun.

It is an advantage of the present invention that it is relatively easy to manufacture.

It is a feature of the present invention that the longitudinal axis of a nail or stud is angled with respect to the plane of a substantially flat bearing surface portion.

These and other objects, advantages, and features will become readily apparent in view of the following detailed description.

BRIEF DESCRIPTION OF THE DRAWINGS

FIG. 1 is a perspective view of a prior art fastener bracket.

FIG. 2 is an elevational view of a prior art fastener assembly.

FIG. 3 is a perspective view of a portion of the fastener assembly of the present invention.

FIG. 4 is an elevational view of the fastener assembly of the present invention prior to being driven with a power actuated gun.

FIG. 5 is an elevational view of the fastener assembly of the present invention after being driven with a power actuated gun.

DETAILED DESCRIPTION OF THE PREFERRED EMBODIMENTS

To more completely appreciate the present invention, a prior art fastener assembly used to fasten pipe is described in greater detail. FIG. 1 illustrates a bracket 10 or portion of a fastener assembly. The bracket 10 has a curved portion 12 and a substantially planar portion 14. Substantially, planar portion 14 has a raised portion 16 with a hole 26 therein. Raised ribs 20 are formed on curved portion 12 and a portion of the substantially planar portion 14. At one end of the curved portion 12 is a rounded or curved front 18. The other end of curved portion 12 is attached to the substantially planar portion 14.

FIG. 2 is an elevational view illustrating the bracket 10 illustrated in FIG. 1 with a nail 23 positioned therein. The nail 23 has a shaft 22. Shaft 22 has a longitudinal axis 34. The nail 23 also has a head 28 and a pointed end 36. The shaft 22 is frictionally retained within the hole 26 on the raised portion 16. The substantially planar portion 14 forms a bearing surface plane 24 which rests on substrate 32. Between the substantially planar portion 14 and the curved portion 12 is a bend 30. The longitudinal axis 34 is substantially perpendicular with the bearing surface plane 24. While the prior art fastener assembly illustrated in FIGS. 1 and 2 has been used to hold a round pipe, often the pipe is not securely held. It is common for substrates to vary. Therefore, when the nail 23 is driven into the substrate 32, often the nail 23 is overdriven into the substrate 32 causing the bend 30 to deform and the curved front 18 to raise up off the surface of the substrate 32. This results in the pipe not being securely held. This may cause vibrations and undesirable noise. Additionally, the curved front 18 causes the fastener assembly to rock laterally back and forth, which may eventually loosen the nail 23 within the substrate 32. As a result, the fastener assembly may prematurely fail.

FIG. 3 illustrates in perspective view bracket 110 of the present invention. Bracket 110 has a curved portion 112 and a substantially planar portion 114 with a raised portion 116. Raised portion 116 has a hole 126 therein. The hole 126 in raised portion 116 is not centered therein, but is eccentrically positioned. By eccentrically positioned hole it is meant that the hole is positioned such that when a nail is inserted within the raised portion the longitudinal axis of the nail is skewed or oblique to the major plane of substantially planar portion 114. Curved portion 112 also has a squared or straight front end 118 at the distal end thereof. The straight front end 118 is cut square with the longitudinal edges of the curved portion 112. Additionally, curved portion 112 may extend slightly greater than one hundred and eighty degrees around a curved or circular arc. Therefore, the distance between front end 118 and an edge formed by bend 130 may be less than the average diameter of the curved portion 112. Additionally, the bracket 110 being preferably made of metal could be made of a metal designed to be slightly springy so that the curved portion 112 will deform slightly and then snap back into position.

FIG. 4 is an elevational view illustrating the present invention prior to being driven by a power actuated gun, not shown. A nail 123, having a head 128, a shaft 122 and a pointed end 136 is frictionally retained or press fit within the hole 126 formed in the raised portion 116 on the substantially planar portion 114. The shaft 122 has a substantiated longitudinal axis 134. The substantial longitudinal axis 134 is skewed or oblique and forms an angle other than ninety degrees with respect to a bearing plane 124 of the substantially planar portion 114. Accordingly, an edge formed by bend 130 is raised above the substrate surface 132 and a rear edge 140 is in contact with the substrate surface 132. The fastener assembly may be held in position either by the pointed end 136 of the nail 123 contacting the surface of substrate 132, or by the front edge formed by bend 130 contacting a pipe 142 and the rear edge 140 contacting the surface of substrate 132.

FIG. 5 is an elevational view illustrating the present invention after being driven by a power actuated gun, not shown. The force of the power actuated gun drives the substantially planar portion 114 into contact with the substrate 132, thereby causing the curved portion 112 to snugly fit around the outside diameter of the pipe 142. Therefore, the pipe is securely held in position. Also, as a result, front edge 118 is caused to wrap around the pipe 142. Additionally, the square edge of front end 118 prevents the fastener assembly from rocking laterally back and forth which could loosen the fastener assembly from the substrate 132. As a result, the pipe is more securely fastened with the present invention.

The present invention provides a fastener assembly, for use with a power actuated gun, that has a configuration to more securely hold a pipe than previously possible with prior art fastener assemblies. The configuration of the present invention provides an improved fastener assembly with no additional parts. Therefore, the fastener assembly of the present invention, having the disclosed configuration, can be manufactured at the same cost as less desirable prior fastener assemblies. Accordingly, it should be appreciated that the present invention improves the fastener assembly arts.

While the present invention has been described with respect to several embodiments, it should be appreciated that various modifications may be made without departing from the spirit and scope of this invention.

What is claimed is:

1. A fastener assembly for use with a power actuated gun in attaching pipe to a substrate comprising:

a bracket having a curved portion, a substantially flat portion, and a raised portion having an eccentrically positioned hole; and a nail having a shaft with a longitudinal axis, said nail extending through the hole in the raised portion, the longitudinal axis of said nail being oblique to the substantially flat portion.

2. A fastener assembly for use with a power actuated gun as in claim 1 wherein:

said nail has a pointed end that extend below the substantially flat portion.

3. A fastener assembly for use with a power actuated gun as in claim 1 wherein:

the raised portion is substantially hemispherical.

4. A fastener assembly for use with a power actuated gun as in claim 1 wherein:

the curved portion extends around greater than one hundred and eighty degrees.

5. A fastener assembly for use with a power actuated gun as in claim 1 wherein:

the curved portion has a distal end ending with a straight front end.

6. A fastener assembly for use with a power actuated gun in attaching cylindrical pipe to a substrate comprising:

a partial substantially cylindrical curved portion extending greater than one hundred and eighty degrees around a circular arc and ending with a straight end;

a substantially flat bearing surface portion extending from an end of said partial substantially cylindrical curved portion;

a raised hemispherical portion having an eccentrically positioned hole therein formed within said substantially flat bearing surface portion; and a nail having a shaft with a longitudinal axis, said nail extending through and frictionally retained within the eccentrically positioned hole in said raised hemispherical portion, the longitudinal axis of said nail being oblique to the major plane of said substantially flat bearing surface portion.

* * * * *